March 15, 1966
W. T. HENRY
3,240,277
GARDEN AND FIELD TOOL
Filed Jan. 8, 1964
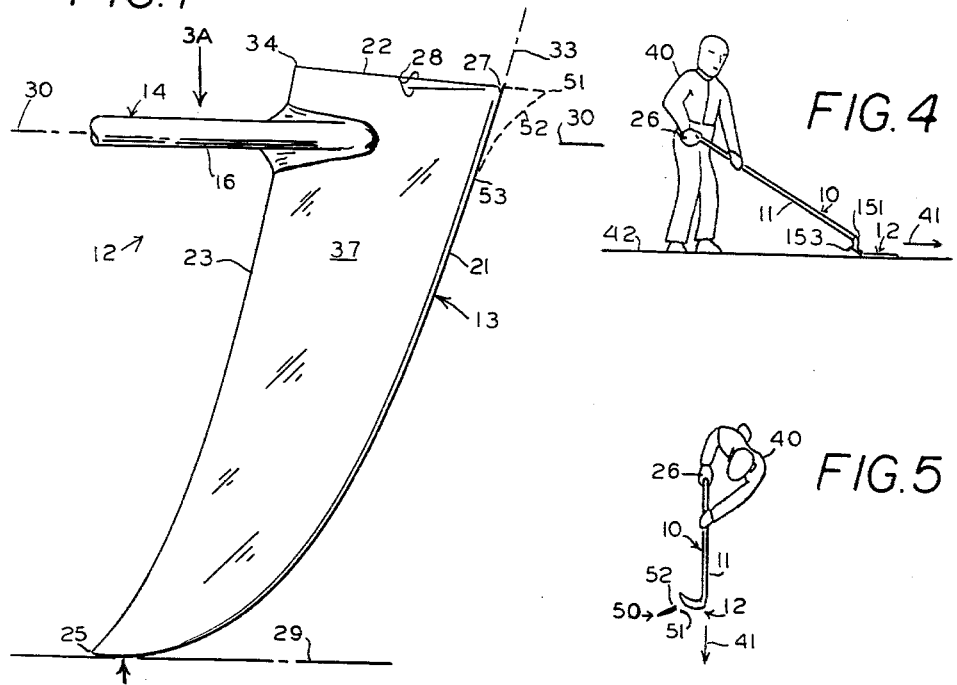
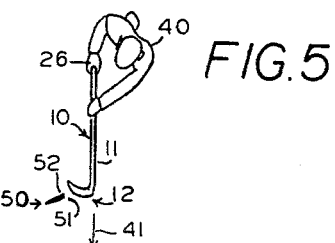
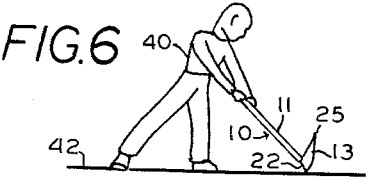
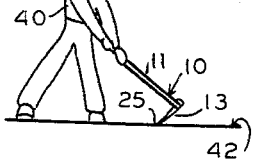
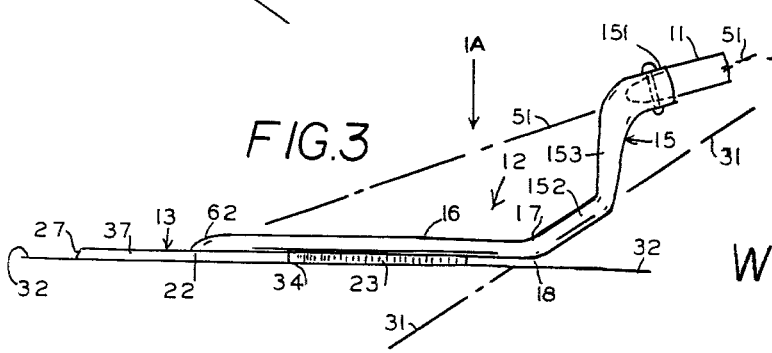
W. T. HENRY
INVENTOR.
BY
*Ely Silverman*
ATTORNEY

United States Patent Office 3,240,277
Patented Mar. 15, 1966

3,240,277
GARDEN AND FIELD TOOL
William Thomas Henry, Tinnie, N. Mex.
(3503 Polk St., Amarillo, Tex.)
Filed Jan. 8, 1964, Ser. No. 336,409
1 Claim. (Cl. 172—375)

This application is a continuation-in-part of my application Serial No. 137,178 filed September 11, 1961, now abandoned.

This invention relates to an improved garden and field tool.

It is an object of this invention to provide an improved tool for garden and field use by which weeding and hoeing is made easier, faster, and more efficient than heretofore.

Another object is to provide a tool having a blade adapted to be moved in a plane lying substantially parallel with the surface of the ground and adapted for work wherein the ordinary type of hoe is not desirable and cannot be used to good advantage.

Yet another object is to provide a garden tool so constructed as to permit a variety of efficient cutting, slicing, and furrowing actions with great ease and an absence of jarring and a minimum of effort in effecting such actions, as well as adapted to chop and rake, which is extremely efficient and convenient and has not been heretofore available.

Other objects and features of this invention will be apparent from the following description which refers to the accompanying drawings, which drawings form a part of the specification and wherein like numerals refer to like parts in all figures and wherein;

FIGURE 1 is a top view, the outline of the blade 13 being shown to scale, of the head portion of a preferred embodiment of a tool made according to this invention; seen along direction of arrow 1A of FIGURE 3.

FIGURE 2 is a right-hand side view of the device shown in FIGURE 1 seen along direction of arrow 2A of FIGURE 1, the relations of the shank 14 and blade being shown to scale;

FIGURE 3 is a left-hand side view of the device shown in FIGURE 1 taken along direction of arrow 3A of FIGURE 1, the relations of the shank 14 and blade being shown to scale;

FIGURE 4 is a diagrammatic side view of an operator using a device made according to this invention as a weeder;

FIGURE 5 is a top view of the operator and device of FIGURE 4.

FIGURE 6 is a perspective diagrammatic view of an operator using the device of this invention as a chopping or furrowing tool; and FIGURE 7 is a diagrammatic side view of an operator using the device of this invention as a gouging tool.

A preferred embodiment of this invention, generally shown as 10, comprises a handle 11 and a steel head indicated generally as 12. In the preferred embodiment the handle is a wooden shaft 5 feet long cylindrical and 1⅛ inches in diameter, although metal tubing may also be used. The head 12 is composed of a blade, 13, and a shank 14. The handle is firmly joined to the head through tough steel shank 14. Shank 14 comprises an upper S-shaped portion 15 and a lower lever arm 16. The upper portion 15 has, in the preferred embodiment, an upper hollow straight ferrule portion 151, a curved intermediate or crook portion 153 and a lower solid straight arm portion 152, and a terminal curved portion 17. The longitudinal axes of portions 151 and 152 lie in the same vertical plane. The upper portion 151 is hollowed at 150 to form a ferrule. Handle 11 firmly fits into and joins said hollowed portion. The longitudinal axis 51 of portion 151 is also the longitudinal axis of handle 11. The forward extension of the longitudinal axis 31 of arm portion 152 intersects the horizontal plane 32 in which the flat surface of the blade 13 lies at an obtuse angle; this angle is 125° in the preferred embodiment. The lever arm 16 is firmly attached at its forward end 62 to the blade 13 and is firmly attached to the lower arm portion 152 through smoothly curved terminal portion 17. The lower curved surface of shank 14 at the junction of arm 16 and lower ferrule portion 152 is hereinbelow referred to as fulcrum 18.

In the preferred embodiment, the lever arm 16 is made of solid ½ inch diameter steel rod and is 5 inches long and has its central longitudinal axis parallel to and ¼ inch above the top flat surface of blade 13, and is straight.

The blade 13 is a thin steel sheet, ⅛ inch thick in the preferred embodiment, flat throughout its entire width and length except for the bevelled portions near the cutting edges thereof. The blade has a curved front cutting edge 21, a side cutting edge 22, and a rear edge 23. The front cutting edge extends laterally and rearwardly and meets the rear edge at a laterally located point 25. This point is the most rearward portion of the blade, regarding the base 26 of the handle 11 as the rear of the tool. The point 25 is directed backwardly; i.e., in the direction of the base 26. The front edge of the blade meets the side edge 22 at the most forward portion of the blade, point 27. The front edge of the blade is formed with a degree of curvature which increases smoothly from point 27 to the laterally located point 25. The front edge of the blade at its junction with the laterally located point 25 is tangent to a line 29 parallel to the straight line 30 which is the vertical projection of the line of the longitudinal axis, 51, of the handle 11, to the plane 32 in which the flat surface of the bottom of blade 13 lies. The front edge 21 of blade 13 near point 27 is tangent, in the preferred embodiment, to a line 33 at an angle of 70° to the line 30.

The rear edge 23 of the blade 13 extends rearwardly and laterally from its point of junction at 34 with side edge 22 to point 25 in a smooth curve. Edge 23 is dull except at point 25. The width of the blade 13 decreases smoothly from the side edge 22, which is 3 inches long in the preferred embodiment, to the laterally located point 25. FIGURE 1 is drawn to scale to show the curvature of edges 21 and 23 in the preferred embodiment.

The side edge 22 extends rearwardly from its junction at point 27 with the front edge to its junction at point 34 with the rear edge 23. The side edge 22 has a pronounced sharp cutting edge and is straight from point 27 to point 34. This edge extends in a straight line from point 34 to point 27 at an angle 28 of 5° to line 30.

The bottom surface of the flat blade 13 lies in a flat plane 32. The forward projection of the longitudinal axis, 31, of lower ferrule portion 152 intercepts plane 32 behind the junction of line 30 and rear blade edge 23: in the preferred embodiment, axis 31 thus intercepts plane 32 4 inches behind edge 23. The bottom of fulcrum 18 is, accordingly, at the level of surface 37 and, in the preferred embediment, 1 inch behind point 25. There is, in the preferred embodiment, 10½ inches distance from point 25 to point 27 and 8 inches between line 29 and line 30.

The lever arm 16 is joined to the top surface 37 of blade 13 for a distance of 1½ inches and welded thereto in order to form a firm attachment therewith. The line of this attachment of lever arm 16 and the longitudinal axis of arm 16 is parallel to line 30. The point 27 is one inch to the left of line 30. The attachment of the arm 16 to the top surface 37 is by welding with a smoothly faired top surface. Lever arm 16 is joined to blade 13 at a distance from edge 22 which is less than the length of said edge not only to facilitate effecting a slicing action with the edge 22 with a minimum of shifting of the position of the handle from that used in the usual reciprocation of the tool 10 when edge 21 is used for cutting, but also to provide for rigidity of the portion of blade 13 between arm 16 and edge 22 when the tool 10 is used as an ax to chop as shown in FIGURE 6. The angle 28 is also kept slight in order to effectuate the slicing action while the axis of reciprocation of the tool 10 is substantially unchanged from that used when edge 21 is reciprocated to do the cutting in a given area or about a given plant.

While in the ordinary procedure of hoeing using a conventional hoe a series of spaced apart vertical cuts are made in order to destroy the growth in the ground, the growth between such cuts is not affected except as such earth may be pulled back. In contrast, use of the tool according to this invention cuts all growth, such as weeds, in the line of movement of the operator, while providing positive control of the level at which the cutting, pulling and tearing edges of the tool works; and inasmuch as this device provides for cutting in a line parallel to the ground, it provides for completely cutting all of the surface and subsurface growth along the path 41 in which the operator, as 40 in FIGURES 4 through 7, moves.

The tool above described in detail is designed to be operated by being pushed by the operator parallel to the surface 42 of the ground along the direction of line 30 and, also, at an angle thereto in order to effect the slicing action below described. In such operation, the blade 13, lies flat on the ground 42 and the operator raises or lowers the handle 11 to obtain and maintain the blade cutting depth desired. Thus the operator may, without jarring, using the weight of his body rather than the strength of his arms, push the blade just under the top soil surface and so destroy not only the weeds that are visible above the top of the soil but, also, those weeds which have begun to sprout and are about to burst through the soil surface. The use of the tool of this invention leaves the ground smooth and fallow. When used for plants planted on ridges the operator can push and slide the edge 22 or point 25 of the tool close to plants and so destroy the weeds while not damaging the ridge or the bed. This tool is, also, useful for cutting weeds under structures such as fences where such are difficult to reach by conventional hoes. Further, this tool works in rocky soil where it is substantially impossible or impractical to use a regular hoe. Further still, the tool of this invention provides a much faster and easier and better work than the conventional hoe. The device of this invention need seldom be raised during operation—except for its use an ax and furrower as below described, so the operator gets substantially no jar in his hands and shoulders and back in using this tool while there is, of course, substantial jarring action on the operator in hoeing using the conventional hoe. The dull edge 23 permits pulling of weeds and brush without change of posture by the operator, as 40.

The operation of the tool provided herewith effectively cuts, but does not inflict any jarring to the shoulder of the user as is provided in the conventional hoes, not only because there is no instantaneous jar due to forceful contact and impact of the blade of the tool with the ground but also, because the angle of the front edge of the blade, 13, gradually distributes any stress met by said blade evenly over the distance of the stroke of the blade.

The long handle 11 and the short lever arm 16 provide a lever action, rotating about fulcrum 18, for ready control, with substantially mechanical advantage, over the angle with which the blade 13 enters into, travels in and exits from the soil or travels thereover. The fact that the axis 31 intercepts the plane of the blade and the fulcrum 18 may contact the earth at a point spaced behind the rearmost edge of the blade permits reduced friction between the blade and ground by application of light downward pressure applied to the base 26 of the handle. The rearwardly directed point 25 in combination with fulcrum 18 serves to act as a guide and control of the level and angle of the blade 13 with respect to the ground in which the tool 10 works. The blade 13 is, accordingly, moved by the operator conveniently and controllably at such angle and depth as is desired.

While a forward extension of axis 31 of lower arm portion 152 of shank 14 meets plane 32 behind the rear edge of blade 13 and so, as above described, provides control of the blade 13 angle and position, the forward extension of the longitudinal axis 51 of handle 11 intercepts the blade 13 substantially at the middle of blade 13 along the line of junction of the lever arm 16 and blade 13 near the front edge 62 of the lever arm 16. This relation of handle and blade provides that force applied along the length of handle 11 is applied to the blade along a straight line instead of such force bearing on a point outside the edge of the blade. This relation facilitates as well as makes more convenient and efficient the operation of tools made according to this invention.

The use of a thin blade of relatively small width as hereinabove disclosed facilitates the underground movement of the blade while its widely spaced points of contact—18, 25, and 27—provides a wide base that provides, to the tactile sense of the operator, a positive indication of the position of the blade 13 with respect to the surface of the ground being treated and so facilitates his control of reciprocation and other movement of the blade 13 with respect to such surface.

The leading edge of the blade 13 is at a rearward angle to the path of travel, 41, of the device 10. This facilitates the destruction of material met by edge 21 by a slicing as well as by a cutting action. The slicing action provided by this tool is advantageous in cutting weeds in the same manner that one may readily cut a cord by the slicing, sliding action of a knife while such cord may not be readily cut by attempting to crush the cord against the knife while attempting to cut such cord in a plane and direction perpendicular to the length of that cord. Thus, this tool provides an improved cutting action by its incorporation of the process of slicing through the relation of cutting edges 21 and 22 to the direction of the length and location of shaft 11. Further, a great variety of cutting angles may be presented to growths such as weeds in the path 41 of the blade 13 by the variation of degree of curvature of the front edge 21 of blade 13 from point 27 to 25. A corresponding wide range of cutting edge angularity is thus available against a weed on reciprocatory motion of blade 13 along the direction of even the one line 30. As the lateral edge of blade 13 near point 25 is substantially parallel to line 30 a weed, as 50, will be cut from its side, as 51, as well as from its front surface 52 facing the operator 40 by the action of the tool of this invention with only very slight change of motion of the operator's hands.

As shown in FIGURE 7, the point 25 may be used as a gouge by simple shifting of the tool in the operator's hand and the side cutting edge 22 be used as an ax, as in FIGURE 6, by a mere change in hand position. The distance between line 30 and edge 22 allows the operator to chop readily below the ground to a depth corresponding to that distance between line 30 and edge 22.

Further, by the construction of the tool, according to this invention, there is only one rearmost point 25 on the blade and thus the blade is readily rotatable thereabout or about fulcrum 18 to permit disengagement of the blade from the ground and ready maneuvering of the blade in or on the soil.

The device 10 allows the ground to be treated with minimum of digging up of the surface and thereby minimizing loss of moisture from the ground by this treatment. The device also allows the operator to furrow— that is, to open up a row—using the corner point 27, then covering up the furrow thus made by drawing edge 21 over such furrow.

A tool and blade of the above-described construction is, thus, easier to use than hoes with blades of known shape, and a tool and blade of this construction according to this invention is more adaptable to varied strokes, motions and functions, as above described, than blades and tools heretofore known.

The device also is self-sharpening as it operates with a sliding action and is particularly effective in rocky soil.

In another embodiment within the scope of this invention the zone of juncture of edges 21 and 22 is formed into a forwardly projecting point 51, the outline of which is shown in dotted lines in FIGURE 1. The point has a rightwardly and rearwardly sloped cutting edge 52 with which to engage and cut roots and other matter: edge 52 flows smoothly at point 53 into cutting edge 21. Edge 22 is 3¼ inches long (FIGURE 1 being drawn to scale of ½ inch on drawing equals 1 inch on actual working model). Point 51 projects ¾ inch beyond, in direction of edge 22, of the meeting of the line of edge 21 and the line of edge 22. Edge 52 extends 1½ inches to point 53 at the right of point 51 and has a radius of curvature of 3¼ inches.

Although, in accordance with the provision of the patent statutes, this invention has been described as embodied in concrete form and the principle of the invention has been described in the best mode in which it is now contemplated applying such principles, it will be understood that the construction shown and described is merely illustrative and that the invention is not limited thereto since alterations and modifications will readily suggest themselves to persons skilled in the art without departing from the true spirit of the invention or from the scope of the annexed claim.

I claim:

A garden and field tool comprising a handle and a head, the handle being an elongated shaft and firmly joining to the head, the head comprising a shank and a thin blade, said blade being substantially flat at its top and bottom throughout its width and length, one surface of said blade lying in a first flat plane, said blade having a side cutting edge, a front cutting edge, and a rear edge, the front cutting edge extending laterally and rearwardly and meeting said rear edge at a laterally located point, said point being directed rearwardly and being the rearmost portion of said blade, the front edge meeting the side edge at the most forward point of said blade, the front edge being formed with a degree of curvature increasing smoothly from said most forward to said laterally located point, and said front edge near its junction with said laterally located point being tangent to a line parallel to a vertical projection of the line of the axis of said shaft to said first flat plane, the rear edge extending laterally and rearwardly from the side edge to said laterally located point and being smoothly curved and dull, the width of the blade decreasing smoothly from said side edge to said laterally located point, said side edge extending rearwardly and laterally from its junction with the front edge to its junction with the rear edge in a line at an angle of about 5° to the vertical projection of the axis of the handle on the first flat plane, a forward straight extension of the longitudinal axis of said handle intercepting said first flat plane between the front and the rear edges of said blade, said shank being composed of an upper S-shaped hollow ferrule arm joined firmly to said shaft, said ferrule being at its upper portion straight and coaxial with the shaft, and a straight and horizontal lever arm firmly attached to said blade and elongated in a plane parallel to and adjacent to the top surface of said blade, said upper portion of the S-shaped arm extending substantially vertically downwardly and being joined to said straight and horizontal lever arm portion at a first point rearward of the rearmost edge of said blade by a second, lower portion of said S-shaped arm extending forwardly and downwardly and having a longitudinal axis of which axis the forward extension intercepts said first flat plane at a point behind the rearmost edge of said blade, and said straight and horizontal second arm being attached to said lever arm at said first point.

References Cited by the Examiner

UNITED STATES PATENTS

| | | | |
|---|---|---|---|
| 1,127,015 | 2/1915 | Keeler | 172—375 X |
| 1,468,628 | 9/1923 | Dunbar | 172—371 |
| 1,749,674 | 3/1930 | Roberson | 30—318 X |
| 2,264,636 | 12/1941 | Griswold et al. | 172—371 |
| 2,969,120 | 1/1961 | Randolph | 172—371 |

FOREIGN PATENTS

| | | |
|---|---|---|
| 584,971 | 12/1924 | France. |
| 14,790 | 6/1913 | Great Britain. |

References Cited by the Applicant

UNITED STATES PATENTS

| | | |
|---|---|---|
| 619,630 | 2/1899 | Snyder. |
| 669,163 | 3/1901 | Grover. |
| 1,190,338 | 7/1916 | Stevens. |
| 1,475,362 | 11/1923 | Brackett. |
| 2,015,916 | 10/1935 | Blocher. |
| 2,264,636 | 12/1941 | Griswold et al. |
| 2,969,120 | 1/1961 | Randolph. |

ABRAHAM G. STONE, *Primary Examiner.*